United States Patent [19]

Edgerton et al.

[11] Patent Number: 4,469,392
[45] Date of Patent: Sep. 4, 1984

[54] OCEAN BOTTOM SEISMIC CABLE CONNECTOR

[75] Inventors: Gene A. Edgerton; John H. Engel; Henning Ottsen, all of Ventura, Calif.; Henry A. Seal, Arlington, Tex.; Joseph F. Wadsworth, Ojai, Calif.

[73] Assignee: Mobil Oil Corporation, New York, N.Y.

[21] Appl. No.: 359,963

[22] Filed: Mar. 19, 1982

[51] Int. Cl.³ .............................................. H01R 13/56
[52] U.S. Cl. ...................................... 339/117 R; 339/7
[58] Field of Search ............... 339/7, 117 R; 403/122, 403/192

[56] References Cited

U.S. PATENT DOCUMENTS

| | | | |
|---|---|---|---|
| 856,321 | 6/1907 | Wabbsler | 339/7 |
| 2,971,178 | 2/1961 | Reesby | 339/7 |
| 3,959,873 | 8/1969 | Harris et al. | 339/7 X |

Primary Examiner—Eugene F. Desmond
Attorney, Agent, or Firm—Alexander J. McKillop; Michael G. Gilman; Charles J. Speciale

[57] ABSTRACT

A cable connector for connecting marine seismic cables having an electrical conductor and a high tensile strength load transmitting core, comprising a housing having spherical sockets provided in opposite ends thereof, a pair of diametrically opposed grooves extending partially into the inner surface of the spherical sockets and extending longitudinally relative to the housing, strain relief members attached to the cables having substantially spherical ball portions at each end thereof rotatably positioned within the spherical sockets of the housing, and a pair of diametrically opposed pockets in the outer surface of the ball portions arranged to register with the grooves of the spherical sockets. A pair of projections extend from opposite sides of the ball portions and project into the grooves of the spherical sockets whereby the strain relief members are free to simultaneously rotate about the projections and translate along the grooves.

15 Claims, 9 Drawing Figures

OCEAN BOTTOM SEISMIC CABLE CONNECTOR

FIELD AND BACKGROUND OF THE INVENTION

1. Field of the Invention

The present invention relates to a cable connector for connecting marine seismic cables.

2. Background of the Invention

Marine seismic cables are used extensively in characterizing various physical properties of subsurface earth formations underlying offshore and other submerged areas. In marine seismic exploration, seismic energy is generated by a suitable source and the resulting seismic waves are detected by a plurality of detectors or hydrophones positioned on a seismic cable submerged near the bottom of the water. The cable contains an electrical conductor that transmits the output of the detectors to a shipboard or barge recorder. The conductors are in the form of a plurality of quad conductors which each contain four individual conductors. Each quad conductor transmits the output of two hydrophones and a cable may have up to 30 quad conductors surrounding a high tensile strength load transmitting core and an outer insulating sheath.

Since these cables are of considerable length, it is desirable to provide some means for quickly and simply connecting shorter sections of cable. The connectors must house an electrical conductor assembly and preferably be provided with a coupling for connecting the cable to the connector housing to provide relative movement therebetween and to make the electrical connection watertight. A rotatable coupling between the connector housing and the cable permits the cable to readily pass through the shipboard cable laying apparatus without damage to the electrical connection contained in the connector housing.

The present invention solves the above described problems by providing a connector for underwater seismic cables which is strong, has a watertight electrical connection, and permits relative movement between the connector and the cable within prescribed limits. Due to the flexibility of the connection of the present invention, joined cable sections of varying length can be passed over the sleeve of a shipboard cable laying apparatus without damage to the electrical connection. In addition, the flexible joint between the connector and the cables of the present invention enables the seismic cable sections to accommodate themselves to the irregularities of the sea bottom without damaging the electrical connection therebetween.

SUMMARY OF THE INVENTION

The present invention is directed to a cable connector for connecting marine seismic cables having an electrical conductor and a high tensile strength load transmitting core, comprising a housing having spherical sockets provided in opposite ends thereof, a pair of diametrically opposed grooves extending partially into the inner surface of the spherical sockets and extending longitudinally relative to the housing, strain relief members attached to the cables having substantially spherical ball portions at each end thereof rotatably positioned within the spherical sockets of the housing, and a pair of diametrically opposed pockets in the outer surface of the ball portions arranged to register with the grooves of the spherical sockets. A pair of projections extend from opposite sides of the ball portions and project into the grooves of the spherical sockets whereby the strain relief members are free to simultaneously rotate about a first axis passing through the projections and a second axis perpendicular to the first as the projections move along the grooves. The housing is preferably tubular and longitudinally split into two parts with the parts being detachably boltable together. The grooves in the spherical sockets of the housing are preferably arcuate in shape and extend through the length of the socket. In addition, an electrical connection means is concentrically supported within the housing in electrically insulated and liquid tight connection with the electrical conductors of the cables. Flexible distortable bellow-type envelopes within the housing have one end secured to the strain relief member and the other end secured to the electrical connection means. An incompressible pressure fluid is confined within each bellows whereby the electrical conductors of the cable passing from the strain relief member to the electrical connection means are pressure equalized with the water pressure surrounding the conductors. In another embodiment of the present invention, a connector similar to that described is provided which connects a seismic marine cable to an anchor on the bottom of the water.

DESCRIPTION OF A PREFERRED EMBODIMENT

Figures 1, 6:
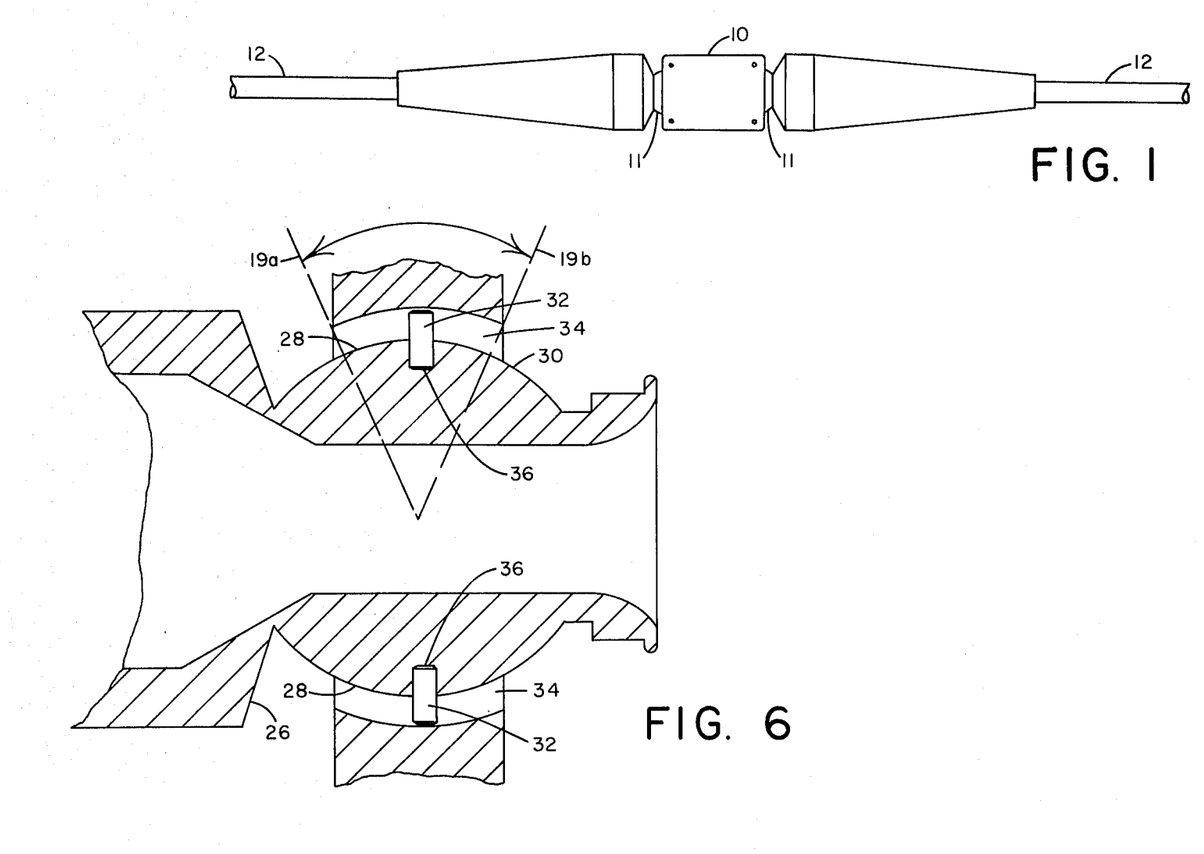
FIG. 1 is a side elevational view of the present connector in assembled relation.
FIG. 6 is a cross-sectional view of the second ball joint taken along lines 6—6 of FIG. 2.
Figure 4:
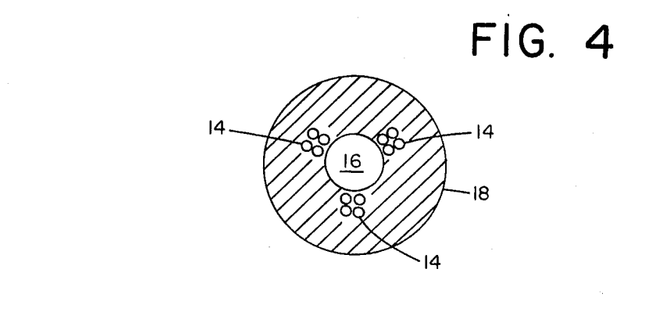
FIG. 4 is an end cross-sectional view taken through the cable of FIG. 3.

Referring first to FIG. 1, the present invention is adapted to provide a cable connector assembly generally designated as 10 for mechanically and electrically connecting marine seismic cables 12 with rotatable ball and socket coupling means 11 adjacent each end of the connector assembly. Each cable 12, shown in detail in FIG. 4, comprises at least one inner conductor 14 and preferably a plurality of quad conductors 14 (four conductors per quad), and inner high tensile strength load transmitting core 16, and an outer insulating sheath 18. The core 16 is preferably made of Kevlar. Each quad conductor 14 consists of four individual conductors twisted together.

Figure 2:
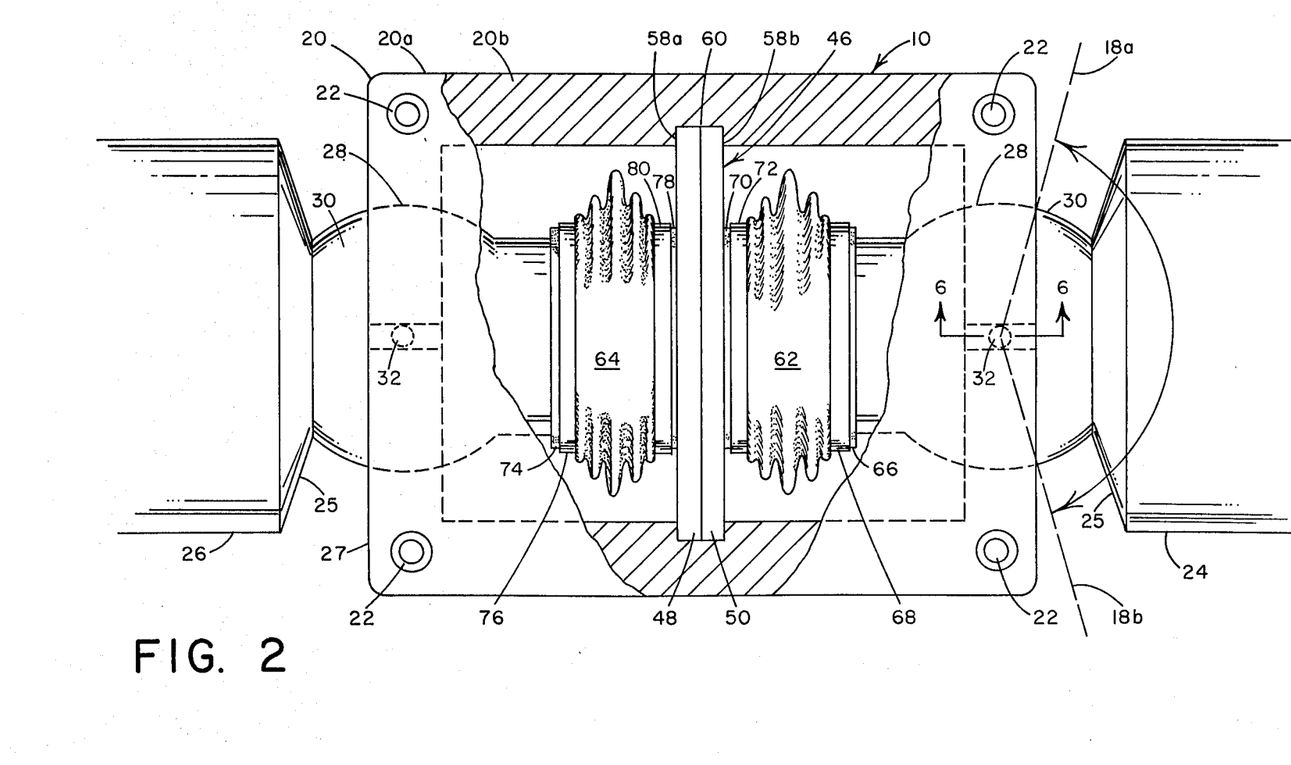
FIG. 2 is an enlarged fragmentary view partly in section of the housing member and ball joints shown in FIG. 1.

As shown in FIG. 2, the cable connector 10 comprises a housing 20 formed in two parts, 20a and 20b, to facilitate assembly of the device and preferably in the form of an elongated hollow cylindrical member constructed of metal and secured together by bolts 22.

Each end of the housing 20 is rotatably coupled to a first termination member 24 and a second termination member 26 by means of a ball and socket type universal joint. Adjacent the interior of each end of the housing 20 is provided sockets 28 which are spherical in shape. Positioned within each of the spherical sockets 28 is a generally hollow semi-spherical ball portion 30, with each ball portion 30 being integrally secured to termination members 24 and 26.

The universal connection between the tubular housing 20 and each ball portion 30 is accomplished by a pair of diametrically opposed pivot pins 32 disposed in a horizontal plane as shown in both FIGS. 2 and 6. More particularly, as shown in FIG. 6, a pair of diametrically opposed arcuate grooves 34 extend partially through the interior surface of each spherical socket 28 and in a longitudinal plane passing through the axis of the tubular housing 20. Grooves 34 have sufficient length to permit enough travel of the pivot pins 32 therein to accomplish the universal movement required. For this purpose, the grooves 34 extend on opposite sides of the medial diameter of each spherical socket 28 and extend through the length of the sockets. A pair of diametrically opposed pockets or recesses 36 are provided in the outer surface of each ball portion 30 which are arranged to register with the grooves 34 of the spherical sockets 28. The inner ends of a pair of pivot pins 32 loosely but snugly sit in the pockets 36 and the other ends of the pins 32 project into the grooves 34 of sockets 28. The inner ends of pivot pins 32 are seated in the pockets 36 in a fixed but rotatable position to permit termination members 24 and 26 to rotate on the pivot pins about their horizontal axis within certain prescribed limits as shown in FIG. 2 by phantom lines 18a and 18b. The pivot pins 32 project into the grooves 34 and such grooves are sufficiently elongated to permit travel of the pins therein so as to enable termination members 24 and 26 to be able to rotate about their vertical axis within certain prescribed limits as shown in FIG. 6 by phantom lines 19a and 19b, thus providing a universal joint. The vertical axis about which each termination member rotates is perpendicular to the respective horizontal axis passing through the projections of the termination members. The angular movement of each ball portion 30 is restricted by the back edge 25 of termination members 24 and 26 engaging the outer end 27 of the tubular housing 20 (see FIG. 2).

Figure 3:
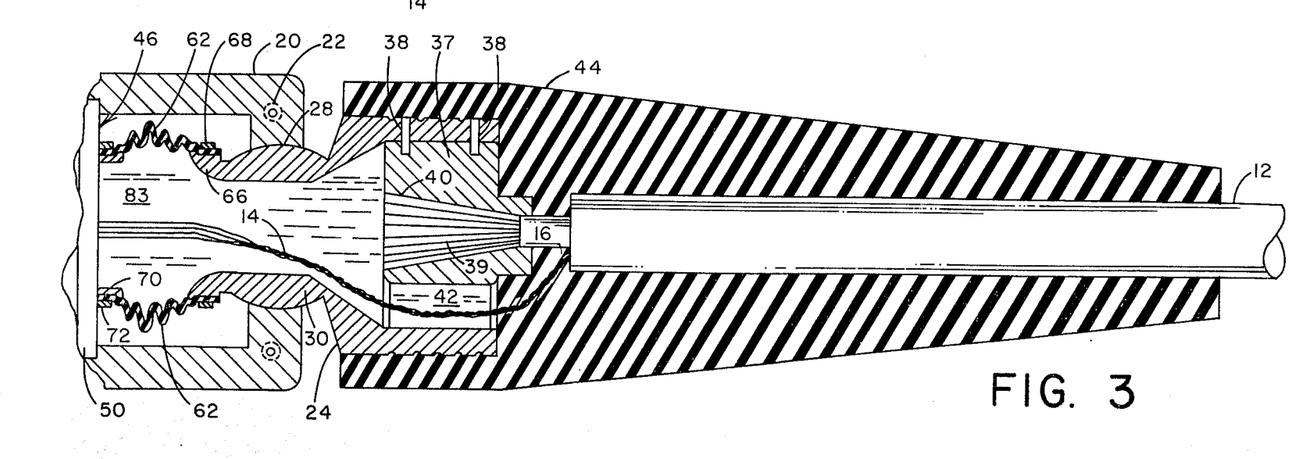
FIG. 3 is an enlarged fragmentary view partly in section of one end of the connector shown in FIG. 1.
Figure 5:
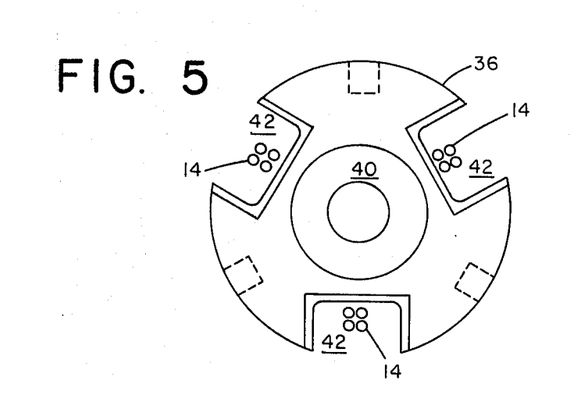
FIG. 5 is an end view of the swedge block facing the housing as shown in FIG. 3.

Now referring to FIG. 3, each of said members 24 and 26 are adapted to receive and be attached to cable core 16 of cable 12 by means of a swedge block 37 which provides strain relief between housing 20 and quad conductors 14. Swedge block 37 is supported within termination members 24 and 26 by means of dowel pins 38. The load transmitting core 16 of cable 12 passes through swedge block 37 and the strands 39 of the core are flared out to conform to a tapered orifice 40 formed in swedge block 37 and retained by means of an epoxy resin or other retaining means. Swedge block 37 is provided with three grooves 42 as shown in FIG. 5 to provide a passage for the quad conductors 14 extending from cable 12.

Each of said members 24 and 26 are also provided with a tapered strain relief member 44 molded thereto and encompasses a section of cable 12 as shown in FIG. 3. This member 44 is preferably molded from polyurethane and prevents a shortened radius of the cable 12.

Figure 7:
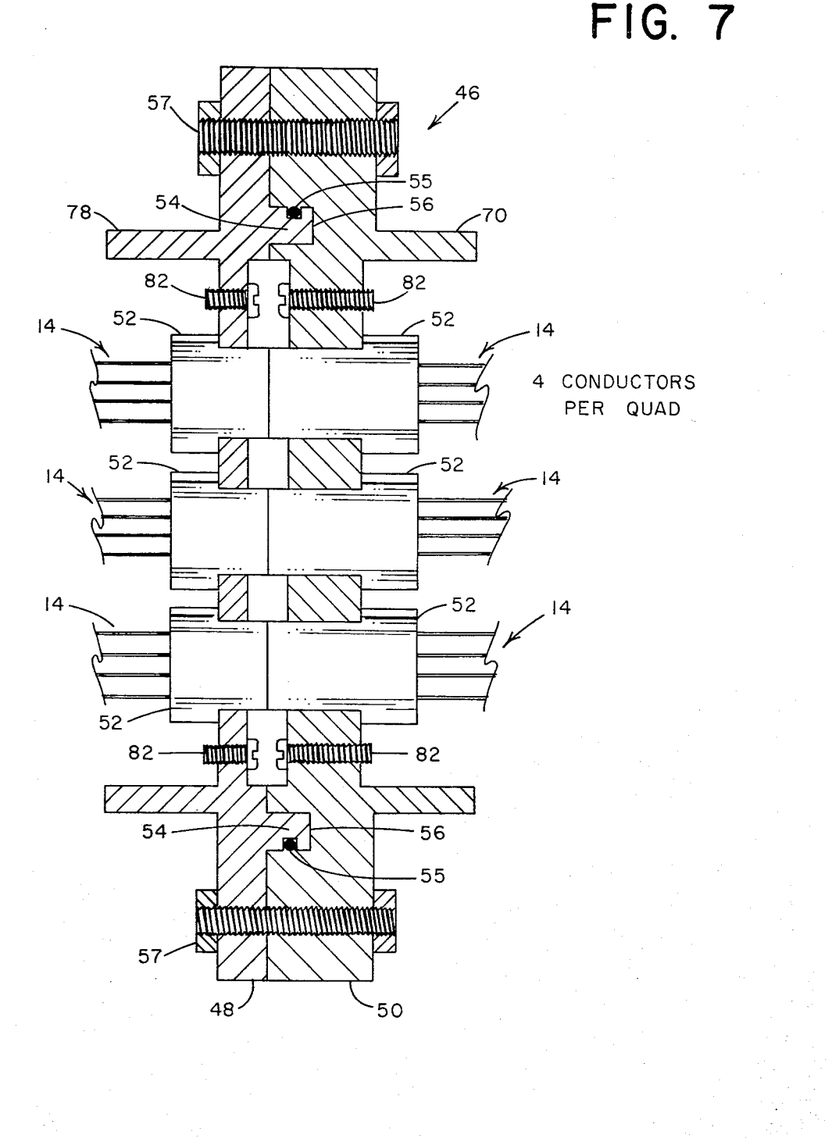
FIG. 7 is a cross-sectional view of the electrical connector assembly shown in FIG. 2 illustrating the positioning plates concentrically supported within the tubular housing that supports the electrical connectors.

Now referring to FIGS. 2 and 3, an electrical connector assembly 46 is concentrically supported within the tubular housing 20 by means of male and female positioning plates 48 and 50 so as to electrically connect the quad conductors 14 which extend from cable 12, only one quad conductor being shown in FIG. 3 for clarity. The quad conductors 14 extend through the grooves 42 of swedge block 37, through the ball and socket coupling means adjacent each end of the housing 20, pass through the housing and are electrically connected by connectors 52 supported in male and female positioning plates 48 and 50 as shown in FIG. 7. Referring to FIG. 7, male plate 48 has an outwardly extending flange 54 that seats within a radial recess 56 formed in female plate 50. Plates 48 and 50 are sealed to each other by means of a gasket, such as a rubber "O" ring 55 and maintained in juxtaposition with respect to each other by bolts 57. Referring to FIG. 2, plates 48 and 50 are concentrically supported within the housing 20 by outwardly extending flanges 58a and 58b which seat within a radial recess 60 formed in the interior surface of housing 20.

The connectors 52 shown in FIG. 7 are preferably conventional male and female plastic pin block connectors that are sealed to plates 48 and 50 and insulated therefrom. As illustrated in FIG. 7, each cable 12 being electrically connected contains three quad conductors wherein each quad conductor consists of four individual conductors, therefrom making a total of twelve individual conductors per cable. As shown in FIG. 7, there are three plastic pin block connectors 52 supported in support plates 48 and 50 which electrically connect said conductors. While only three quad conductors per cable 12 are represented in FIG. 7, it is understood that additional quad conductors and pin block connectors may be utilized.

Now referring to FIG. 2, the quad conductors 14 passing through housing 20 are enveloped by a first flexible bellows 62 and a second flexible bellows 64 disposed within the housing between each of the ball portions 30 and the connector assembly 46. One end of the first bellows 62 is positioned on the periphery of an outwardly extending flange 66 (see FIG. 3) disposed on the end of ball portion 30 of the first termination member 24 and extends outwardly therefrom and secured thereto by means of a band 68. The opposite end of the first bellows 62 is positioned on the periphery of an outwardly extending flange 70 (see FIG. 7) disposed on the end of female plate 50 and secured thereto by means of a band 72. One end of the second bellows 64 is positioned on the periphery of an outwardly extending flange 74 disposed on the end of ball portion 30 of the second termination member 26 and extends outwardly therefrom and secured thereto by means of a band 76. The opposite end of the second bellows 64 is positioned on the periphery of an outwardly extending flange 78 (see FIG. 7) disposed on the end of male plate 48 and secured thereto by means of a band 80. Each bellows 62 and 64 is constructed from a suitable flexible tough material which is impervious to sea water, for example, polyurethane.

Now referring to FIG. 7, each plate 48 and 50 is provided with removable filler plugs 82 in threaded engagement with the plates through which a suitable incompressible pressure equalizing dielectric liquid can be poured into and out of chambers 83 (see FIG. 3) which provides the transfer of the sea water pressure to these chambers. A suitable such liquid is kerosene known in the seismic art as "cable fluid."

Figure 8:
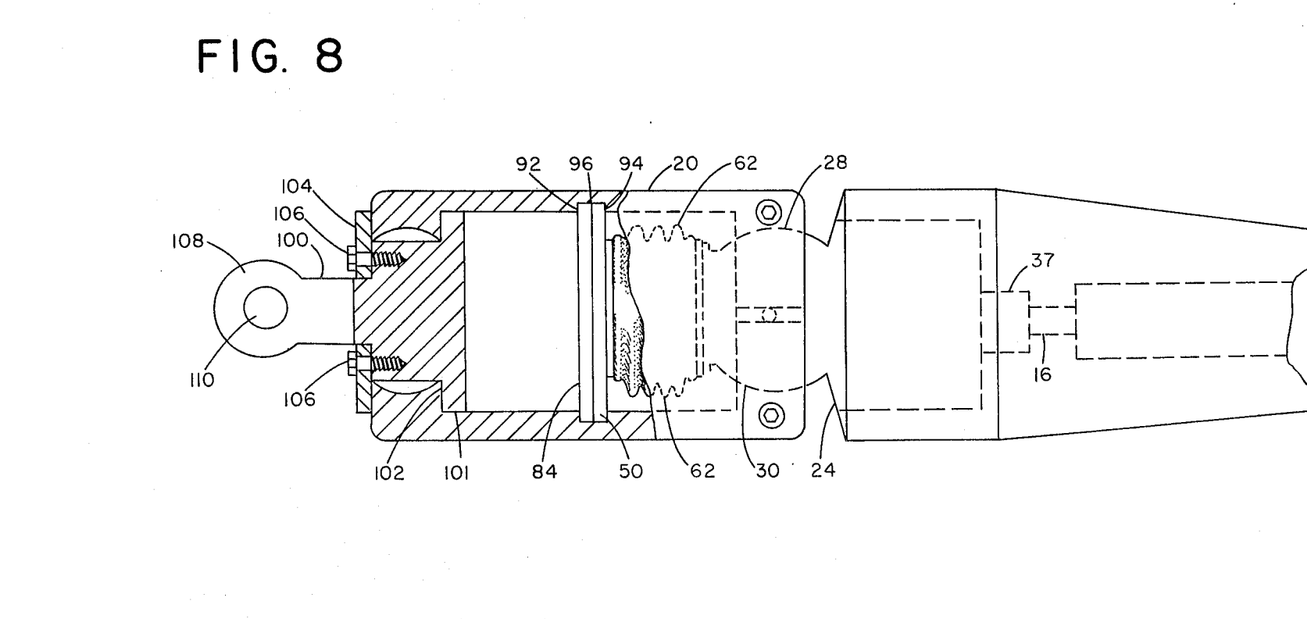
FIG. 8 illustrates in partial cross-sectional view of a still further embodiment of the present invention.
Figure 9:
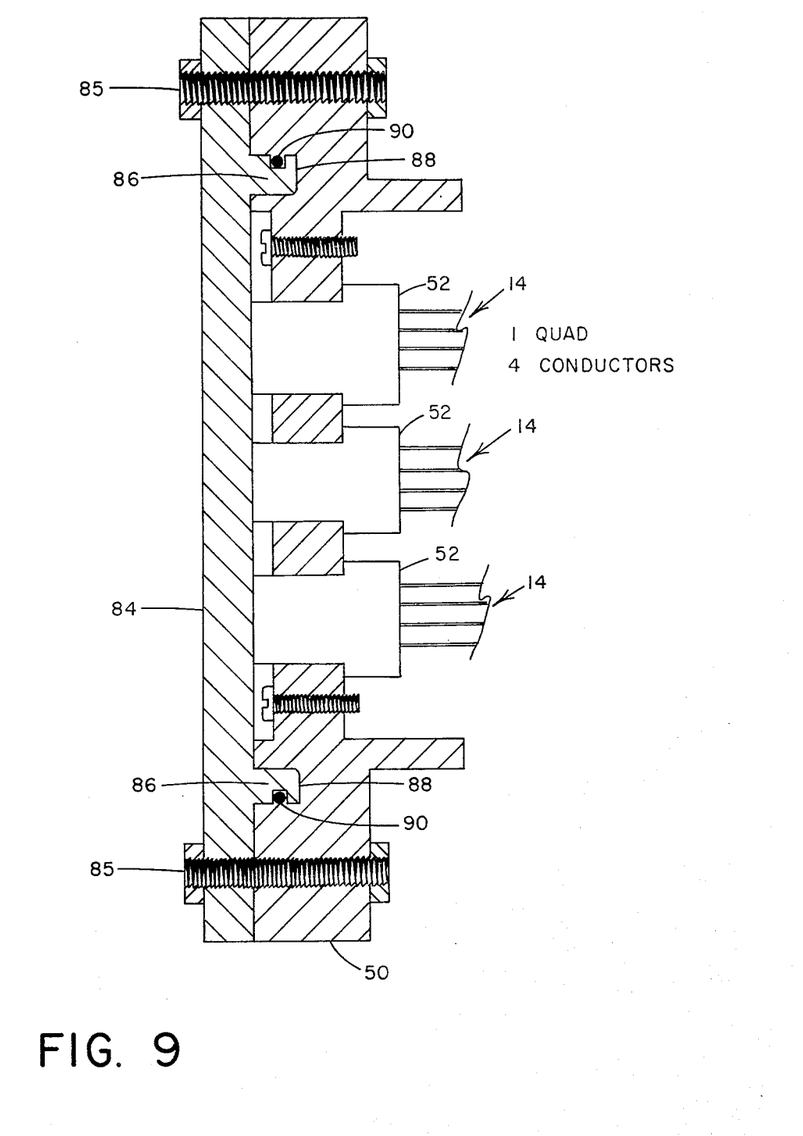
FIG. 9 is a cross-sectional view of the modified connector assembly shown in FIG. 8 concentrically supported within the tubular housing.

FIG. 8 illustrates a further embodiment of the present invention for connecting a marine seismic cable to an anchor on the bottom of the ocean. The connector of FIG. 8 has a configuration essentially like that of connector of FIG. 2 except for one end of the housing and one side of the electrical connector which is shown in detail in FIG. 9. In FIG. 8, the female positioning plate 50 of the electrical connnector assembly is secured to a male closure plate 84 by means of bolts 85 shown in FIG. 9. Referring to FIG. 9, the male closure plate 84 has an outwardly extending flange 86 that seats within a radial recess 88 in female plate 50. Plates 50 and 84 are sealed to each other by means of a gasket, such as a rubber "O" ring 90. As shown in FIG. 8, the plates 50 and 84 are concentrically supported within the tubular housing 20 by outwardly extending flanges 92 and 94 that fit into interior slot 96 of the housing 20. Positioned within the other end of the tubular housing 20 is a tension member 100. The tension member has an outwardly extending flange 101 at one end thereof which is seated on the shoulder 102 of the tubular housing and secured thereto by means of an annular retaining plate 104 which is set and pulled up tightly by machine screws 106. The other end of the tension member 100 has a fastening head 108 with an eye opening 110 that can be easily coupled to an anchor on the bottom of the ocean.

From the foregoing, it will be observed that by virtue of this invention, a flexible joint is established between an underwater seismic cable and a rigid housing containing a cable connector assembly which will accommodate itself to the irregularities of the sea bottom, permit it to pass through the cable laying apparatus aboard ship without damage, provide a high quality waterproof electrical connection between two seismic cables, and permit the cable to be laid in sections.

While we have shown and described the preferred embodiment of our invention, it is to be understood that various changes and modifications may be made therein without departing from the spirit of the invention.

What is claimed is:

1. A cable connector for connecting marine seismic cables having an electrical conductor and a high tensile strength load transmitting core, comprising:
   (a) a housing having spherical sockets provided in opposite ends thereof, said housing being split into two parts which are detachably securable together;
   (b) a pair of diametrically opposed grooves in the inner surface of said spherical sockets and extending longitudinally relative to said housing; and
   (c) strain relief members attached to said cables having substantially spherical ball portions at each end thereof rotatably positioned within the spherical sockets of said housing; and
   (d) a pair of diametrically opposed pockets in the outer surface of said ball portions arranged to register with the grooves of said spherical sockets and a pair of projections extending from said pockets and projecting into the grooves of said spherical sockets whereby said strain relief members are free to simultaneously rotate about a first axis passing through said projections and about a second axis perpendicular to the first axis as said projections move along said grooves.

2. A cable connector according to claim 1, wherein said grooves are arcuate in shape and of the same length as said spherical sockets.

3. A cable connector according to claim 2, wherein said projections comprise a pair of pivot pins loosely set in the pockets of said ball portions and projecting into the grooves of said spherical sockets.

4. A cable connector according to claim 1, including electrical connection means concentrically supported within said housing in electrically insulated and liquid tight connection with the electrical conductors of said cables.

5. A cable connector according to claim 1, including a pair of flexible distortable bellows-type envelopes within said housing, each having one end secured to a said strain relief member and the other end connected to an electrical connection means, each said envelope having an incompressible pressure equalizing fluid confined therein whereby the electrical conductors of said cables in passing from a respective strain relief member through a said bellow-type envelope to an electrical connection means are pressure equalized with the water pressure surrounding said connector.

6. A cable connector according to claim 1, wherein the housing is tubular and said two parts are detachably boltable together.

7. A cable connector for connecting one end of a marine seismic cable having an electrical conductor and a high tensile strength load transmitting core to an anchor on the bottom of the water, comprising:
   (a) a housing having spherical sockets provided in opposite ends thereof, said housing being longitudinally split into two parts which are detachably securable together;
   (b) a pair of diametrically opposed grooves in the inner surface of said spherical sockets and extending longitudinally relative to said housing;
   (c) a strain relief member attached to said cable having a substantially spherical ball portion at one end thereof rotatably positioned within the spherical socket of one end of the housing; and
   (d) a tension member attached to the other end of said housing with fastening means on the external end thereof.

8. A cable connector according to claim 7, wherein said grooves are arcuate in shape and of the same length as said spherical sockets.

9. A cable connector according to claim 7, including means in the outer surface of said ball portion of said strain relief member forming a pair of diametrically opposed pockets arranged to register with the grooves of said spherical socket in one end of said housing and a pair of projections extending from said pockets and projecting into the grooves of said spherical socket whereby said strain relief member is free to simultaneously rotate about a first axis passing through said projections and about a second axis perpendicular to the first axis as said projections move along said grooves.

10. A cable connector according to claim 9, wherein said projections comprise a pair of pivot pins loosely set in the pockets of said ball portion which project into the grooves of said spherical socket.

11. A cable connector according to claim 7, including electrical connection means concentrically supported within said housing in electrically insulated and liquid tight connection with the electrical conductors of said cable.

12. A cable connector according to claim 7, including a flexible distortable bellows-type envelope within said housing having one end secured to said strain relief member and the other end connected to an electrical connection means, said envelope having an incompressible pressure equalizing fluid confined therein whereby the electrical conductors of said cable in passing from said strain relief member through said bellow-type envelope to said electrical connection means are pressure equalized with the water pressure surrounding said connector.

13. A cable connector according to claim 7, wherein the housing is tubular and said two parts are detachably boltable together.

14. A cable connector for connecting marine seismic cables having an electrical conductor and a high tensile strength load transmitting core, comprising:
 (a) a housing having spherical sockets provided in opposite ends thereof;
 (b) a pair of diametrically opposed grooves in the inner surface of said spherical sockets and extending longitudinally relative to said housing; and
 (c) strain relief members attached to said cables having substantially spherical ball portions at each end thereof rotatably positioned within the spherical sockets of said housing; and
 (d) a pair of diametrically opposed pockets in the outer surface of said ball portions arranged to register with the grooves of said spherical sockets and a pair of projections extending from said pockets and projecting into the grooves of said spherical sockets whereby said strain relief members are free to simultaneously rotate about a first axis passing through said projections and about a second axis perpendicular to the first axis as said projections move along said grooves; and
 (e) a pair of flexible distortable bellows-type envelopes within said housing, each having one end secured to a said strain relief member and the other end connected to an electrical connection means, each said envelope having an incompressible pressure equalizing fluid confined therein whereby the electrical conductors of said cables in passing from a respective said strain relief member through a said bellow-type envelope to an electrical connection means are pressure equalized with the water pressure surrounding said connector.

15. A cable connector for connecting one end of a marine seismic cable having an electrical conductor and a high tensile strength load transmitting core to an anchor on the bottom of the water, comprising:
 (a) a housing having spherical sockets provided in opposite ends thereof;
 (b) a pair of diametrically opposed grooves in the inner surface of said spherical sockets and extending longitudinally relative to said housing;
 (c) a strain relief member attached to said cable having a substantially spherical ball portion at one end thereof rotatably positioned within the spherical socket of one end of the housing; and
 (d) a tension member attached to the other end of said housing with fastening means on the external end thereof; and
 (e) a flexible distortable bellows-type envelope within said housing having one end secured to said strain relief member and the other end connected to an electrical connection means, said envelope having an incompressible pressure equalizing fluid confined therein whereby the electrical conductors of said cable in passing from said strain relief member through said bellows-type envelope to said electrical connection means are pressure equalized with the water pressure surrounding said connector.

* * * * *